(12) United States Patent
Averbuj et al.

(10) Patent No.: US 9,450,860 B2
(45) Date of Patent: Sep. 20, 2016

(54) SELECTING AN INSTANCE OF A RESOURCE USING NETWORK ROUTABILITY INFORMATION

(75) Inventors: Pablo Averbuj, Fairfax, VA (US);
Mark J. Muehl, Potomac, MD (US);
Vijay Gill, Clifton, VA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 337 days.

(21) Appl. No.: 13/329,841

(22) Filed: Dec. 19, 2011

(65) Prior Publication Data

US 2012/0089671 A1    Apr. 12, 2012

Related U.S. Application Data

(63) Continuation of application No. 11/321,039, filed on Dec. 30, 2005, now Pat. No. 8,082,348.

(60) Provisional application No. 60/691,243, filed on Jun. 17, 2005.

(51) Int. Cl.
| | |
|---|---|
| *G06F 15/16* | (2006.01) |
| *H04L 12/725* | (2013.01) |
| *H04L 12/707* | (2013.01) |
| *H04L 29/08* | (2006.01) |

(52) U.S. Cl.
CPC ........... *H04L 45/306* (2013.01); *H04L 67/327* (2013.01); *H04L 45/22* (2013.01); *H04L 67/101* (2013.01)

(58) Field of Classification Search
CPC ..... H04L 65/80; H04L 67/327; H04L 43/08; H04L 67/06; H04L 67/104; H04L 67/1076; H04L 67/1095
USPC ......................................................... 709/203
See application file for complete search history.

(56) References Cited

U.S. PATENT DOCUMENTS

| | | | |
|---|---|---|---|
| 6,823,372 B1 | 11/2004 | Kreiner et al. | |
| 7,149,797 B1 * | 12/2006 | Weller et al. | 709/223 |
| 7,260,598 B1 * | 8/2007 | Liskov et al. | 709/201 |
| 2003/0028623 A1 * | 2/2003 | Hennessey et al. | 709/219 |
| 2003/0229613 A1 * | 12/2003 | Zargham et al. | 707/1 |
| 2005/0010653 A1 * | 1/2005 | McCanne | 709/219 |
| 2007/0282874 A1 * | 12/2007 | Metcalfe | 707/101 |
| 2009/0106393 A1 * | 4/2009 | Parr et al. | 709/218 |

OTHER PUBLICATIONS

Jeff Hodges, John Kemp, and Robert Aarts, Liberty Alliance Project, Liberty ID-WSF SOAP Binding Specification, Version 1.2, copyright 2004, pp. 1-60.

(Continued)

*Primary Examiner* — Wutchung Chu
*Assistant Examiner* — Najeebuddin Ansari
(74) *Attorney, Agent, or Firm* — Banner & Witcoff, Ltd.

(57) ABSTRACT

A client computer requests a resource from an ISP/OSP. The ISP/OSP maintains multiple instances of the resource. In deciding to which instance of the resource to route the client computer, a resource selection server takes network routability information into account. Geographic proximity, resource utilization, network utilization, and/or maintenance of peering agreements may also be taken into account in selecting the instance of the resource.

21 Claims, 4 Drawing Sheets

(56) References Cited

OTHER PUBLICATIONS

Thomas Zahn, "P2P Networks are Distributed Hash Tables," Seminar: The Economics of Peer-to-Peer Architectures, available at http://www.hu-berlin.del/~fis/p2pe/mini_T_zahn.ppt, pp. 1-33, presented May 7, 2003.

Jianjun Zhang et al., "Constructing a Proximity-Aware Power Law Overlay Network," available at www.cc.gatech.edu/~zhangii/html/zhanp05constructing.pdf, pp. 1-5, presented at IEEE Global Telecommunications Conference (GLOBECOM 2005) Nov. 29, 2005, St. Louis, MO.

Miguel Castro, et al., "Topology-aware routing in structured peer-to-peer overlay networks," Technical Report MSR-TR-2002-82, Microsoft Research, available at www.gnut.org/papers/location.pdf, pp. 1-18, 2002.

Miguel Castro et al., "Exploiting Network Proximity in Distributed Hash Tables," available at www.cs.rice.edu/~druschel/publications/fudico.pdf, pp. 1-4, presented at Proceedings of the International Workshop on Future Directions in Distributed Computing (FuDiCo), Jun. 6, 2002, Bertino Italy.

John Byers, et al., "Simple Load Balancing for Distributed Hash Tables," available at www.iptps03.cs.berkeley.edu/final-papers/simple_load_balancing.ps, (pp. 1-5), presented at $2^{nd}$ International Workshop on Peer-to-Peer Systems (IPTPS '03), Feb. 20, 2003, Berkeley, CA.

Marcin Bienkowski et al., "Dynamic Load Balancing in Distributed Hash Tables," available at www.iptps05.cs.cornell.edu/PDFs/CameraReady_174.pdf, (pp. 1-6), presented at $4^{th}$ International Workshop on Peer-to-Peer Systems (IPTPS '05), Feb. 25, 2005, Ithica NY.

David Tam et al., "Distributed Hash Tables," available at www.eecg.edu/~iacobsen/courses/rvrl70/etopic/DHT/ppt, (pp. 1-26) (last modified Feb. 13, 2003).

Zhichen Xu et al., "Netvigator: Scalable Network Proximity Estimation," available at www.hpl.hp.com/techreports/2004/HPL-2004-28R1.pdf, (pp. 1-9), Mar. 3, 2005.

Albert Greenberg et al., "A Clean Slate 4D Approach to Network Control and Management," ACM SIGCOMM Computer Communication Review, vol. 35, No. 5, available at http://www.acm.orp/siys/sigcomm/ccr/archive/2005/october/p41-greenberg.pdf, pp. 43-54, Oct. 2005.

Albert Greenberg et al., "Refactoring Network Control and Management A Case for the 4D Architecture," available at www.cs.princeton.edu/~jrex/papers/CMU-CS-05-117.pdf, (pp. 1-28), Sep. 2005.

Albert Greenberg et al., "The 4D Architecture for Network Control and Management," available at http://www.cs.cmu.edu/~4D/, (pp. 1-2), accessed on Nov. 29, 2005.

"100x100 Clean Slate Project," available at http://100xl00network.org/, (pp. 1-2), accessed on Nov. 29, 2005.

"Network Control and Management in the 100x100 Architecture," available at www. 100x 100network.org/presentations/Network-Control-and-Management.ppt, (pp. 1-77), presented May 2005.

Hui Zhang, "Clean Slate Design Approach to Networking Research," available at www.cs.cme.edu/~hzhang/Talks/CleanSlate.pdf, (pp. 1-64), presented May 2005.

"DHT (distributed hash table)." available at http://www.networkworld.com/details/805.html?def, (pp. 1-3), accessed Nov. 15, 2005.

"Hash table," available at http://en.wikipedia.org/w/index.php?title=Hash_table&printable=yes, (pp. 1-10), accessed Nov. 15, 2005.

"Distributed hash table," available at http://en.wikipedia.org/w/index.php.?title=Distributed_hash_table&printable=yes, (pp. 1-4), accessed Nov. 15, 2005.

"Key based routing," available at http://en.wikipedia.org/wiki/Kevy_based_routing, (p. 1), accessed Nov. 15, 2005.

* cited by examiner

SELECTING AN INSTANCE OF A RESOURCE USING NETWORK ROUTABILITY INFORMATION

CLAIM OF PRIORITY

This application is a continuation of U.S. patent application Ser. No. 11/321,039, filed Dec. 30, 2005 (now allowed), now U.S. Pat. No. 8,082,348 which claims priority under 35 USC §119(e) to U.S. patent application No. 60/691,253, filed on Jun. 17, 2005, the entire contents of which are hereby incorporated by reference.

TECHNICAL FIELD

This disclosure relates to selecting an instance of a resource.

BACKGROUND

Internet service providers (ISPs) or online service providers (OSPs) may maintain many types of resources on their networks. For example, an ISP/OSP may maintain proxy cache servers, streaming media servers, chat servers (e.g., internet relay chat (IRC) servers), or instant messaging servers on its network. The ISP/OSP may also maintain content servers that make particular types of content available to network users. For example, the ISP/OSP may maintain content servers that make operating system (OS) images or OS updates available to network users. Often, it may be desirable for the ISP/OSP to maintain multiple instances of the same (or similar) resource on its network. For example, the ISP/OSP may maintain multiple instances of a resource on its network in order to handle a high volume of users that connect to the resource. In addition, or alternatively, the ISP/OSP may maintain multiple instances of a resource on its network in order to provide redundancy in the event of failure at one instance of the resource.

SUMMARY

In one aspect, a request for a resource is received from a client. At least two instances of the resource are maintained. The first instance of the resource is accessible by a client through a first network route between the client and the first instance of the resource, and the second instance of the resource is accessible by the client through a second network route between the client and the second instance of the resource. Routability information is accessed. The routability information indicates at least a portion of the first network route and at least a portion of the second network route. One of the two instances of the resource is selected based, at least in part, on the routability information, and the client is instructed to access the selected instance of the resource.

Implementations may include one or more of the following features. For example, selecting one of the instances of the resource may include determining that the indicated portion of the first network route does or does not include a network maintained by an entity that maintains the two instances of the resource, and selecting the first one of the two instances based on this determination.

A geographic location of the client may be determined and one of the two instances of the resource may be selected based on the geographic location of the client in addition to the routability information.

Resource utilization information may be accessed. The resource utilization information may indicate the degree of utilization of the two instances of the resource. One of the two instances may be selected based on the resource utilization information in addition to the routability information.

Network utilization information may be accessed. The network utilization information may indicate network utilization of first and second networks on which the two instances reside. One of the two instances of the resource may be selected based on the network utilization information in addition to the routability information.

One of the two instances of the resource may be selected based on the geographic location of the client, the resource utilization information, and the network utilization information in addition to the routability information.

Selecting one of the two instances of the resource may include determining that the indicated portion of the first network route includes a peering connection with a network that is not maintained by an entity that maintains the two instances of the resource, determining a peering agreement for the peering connection will not be maintained if the first of the two instances is selected, and selecting the second one of the two instances to maintain the peering agreement for the peering connection.

In another aspect, a system includes a routability server, a resource selection server, and a front-end server. At least two instances of a resource are accessible by a client through respective first and second network routes between the client and the instances of the resource. The routability server determines at least a portion of the first network route and at least a portion of the second network route. The resource selection server selects one of the two instances of the resource based, at least in part, on the determined portion of the first network route and the determined portion of the second network route. The front-end server receives a request for the resource from the client and instructs the client to access the selected instance of the resource.

Implementations may include one or more of the following features. For example, the system may include a geography server to determine a geographic location of the client, and the resource selection server may be configured to select one of the two instances of the resource based on the geographic location of the client in addition to the determined portion of the first network route and the determined portion of the second network route.

The system also may include a database that stores resource utilization information that indicates utilization of the first and second instances of the resource. The resource selection server may be configured to select one of the two instances of the resource based on the resource utilization information in addition to the determined portions of the first and second network routes.

The database may additionally or alternatively store network utilization information that indicates network utilization of respective first and second networks on which the two instances reside. The resource selection server may be configured to select one of the two instances of the resource based on the network utilization information in addition to the determined portions of the first and second network routes.

The resource selection server may be configured to select one of the two instances of the resource based on the geographic location of the client, the resource utilization information, and the network utilization information in addition to the determined portion of the first network route and the determined portion of the second network route.

The described techniques may be particularly useful in balancing the load across multiple instances of a resource that uses a protocol having a long-lived and bandwidth intensive connection, and which supports redirects. For example, in some instances, the hypertext transfer protocol (HTTP) is used to transmit large quantities of data using a single connection (e.g., HTTP may be used to transfer large binary files). As another example, the real-time streaming protocol (RTSP) may be used to stream large media files from a streaming media server to a client on a single connection. The described techniques may be particularly useful in such situations to balance the load across the servers providing the binary tiles or streaming media. However, the techniques are not limited to such situations. They may be used, for example, for proxy cache servers that receive HTTP requests for web pages, or for internet relay chat servers.

Implementations of the described techniques may include hardware, a method or process, or computer software on a computer-accessible medium.

The details of one or more implementations are set forth in the accompanying drawings and the description below. Other features and advantages will be apparent from the description and drawings, and from the claims.

DETAILED DESCRIPTION

An ISP/OSP maintains resources on its network, including, but not limited to, proxy cache servers and streaming media servers. The ISP/OSP may maintain multiple instances of the same resource or similar resources. Consequently, when the ISP/OSP receives a request for the resource, the ISP/OSP may select a particular instance of the resource and route the client to the selected instance. In selecting the instance of the resource to which to route the client, the ISP/OSP may take network routability information into account. For instance, the ISP/OSP may take into account whether communications between the client and a particular instance of the resource travel across the ISP/OSP's backbone network, or whether the communications travel across a particular peering connection between the ISP/OSP's network and another network. In addition, geographic proximity, resource utilization, network utilization, and/or maintenance of peering agreements may be taken into account.

Using network routability information as one of the factors involved in selecting an instance of the requested resource may allow the ISP/OSP to reduce the traffic carried across its network, thereby reducing delay and congestion on the ISP/OSP's network. This may improve the end user experience and/or reduce costs for the ISP/OSP. Also, using network routability information may allow an ISP/OSP to maintain peering agreements with other ISPs/OSPs.

Figure 1:
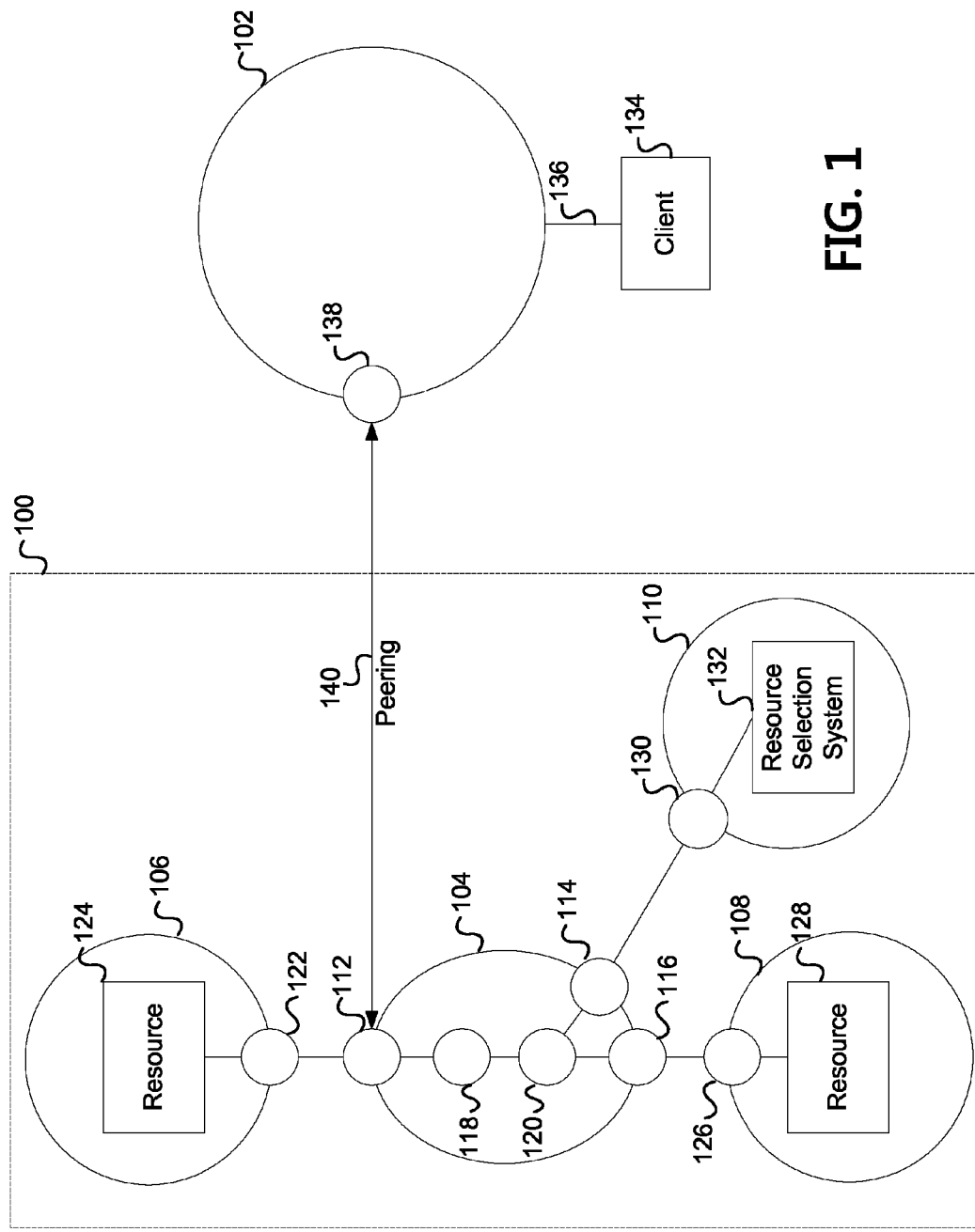
FIG. 1 is a schematic diagram of a networked computing environment.

FIG. 1 illustrates a networked computing environment that includes an ISP/OSP network 100 linked to a peer network 102 through a peering connection 140. ISP/OSP network 100 may include one or more sub-networks such as a backbone network 104 and resource networks 106, 108 and 110. In the example shown, backbone network 104 includes edge routers 112, 114 and 116 for connecting to resource networks 106, 108 and 110, and routers 118 and 120 for routing traffic across the backbone network 104. ISP/OSP network 100 hosts multiple instances 124 and 128 of a resource. The resource is, for example, a proxy cache server or a streaming media server. Resource network 106 includes an edge router 122 for connecting to backbone network 104 and hosts an instance 124 of the resource. Resource network 108 includes an edge router 126 for connecting to the backbone network 104 and hosts another instance 128 of the resource. Resource network 110 includes an edge router 130 for connecting to backbone network 104 and hosts resource selection system 132.

Backbone network 104 and resource network 106 are linked by a peering connection between edge router 112 on backbone network 104 and edge router 122 on resource network 106. Likewise, backbone network 104 and resource networks 108 and 110 are linked by peering connections between respective edge routers 116 and 114 on backbone network 104 and respective edge routers 126 and 130 on resource networks 108 and 110.

Client computer 134 is connected to peer network 102 through a communication link 136. Peer network 102 is linked to backbone network 104 by a peering connection 140 through edge router 112 on backbone network 104 and edge router 138 on peer network 102. Edge routers may implement the Border Gateway Protocol (BGP) for maintaining peer connections and routing packets.

The peering connection 140 between peer network 102 and ISP/OSP network 100 enables client 134 to access resources maintained by ISP/OSP network 100. Resources and/or instances of resources maintained by ISP/OSP network 100 may be accessible to client 134 through one or more network routes. For example, instance 124 may be accessible to the client 134 through a network route that includes resource network 106, edge router 122, edge router 112, peering connection 140, edge router 138, network 102, and communication link 136. Similarly, instance 128 may be accessible to client 134 through a network route that includes resource network 108, edge router 126, edge router 116, backbone network 104, edge router 112, peering connection 140, edge router 138, network 102, and communication link 136.

In one implementation, ISP/OSP network 100 and peer network 102 may be maintained by two separate Tier 1 ISPs that have agreed that the peering connection 140 will be a settlement-free peering connection (i.e., one where neither ISP charges the other one for network traffic exchanged across the peering connection 140). In general, a settlement-free peering connection requires that each peer network exchange data in a predetermined proportion. For example, each peer network may be required to send substantially the same amount of traffic across the peering connection as the network receives across the peering connection.

As described above, ISP/OSP network 100 may maintain multiple instances of the same resource which are shared by client systems accessing the network. For example, ISP/OSP network 100 may have multiple proxy cache servers or streaming media servers located in different geographic locations that provide the same or similar functionality and/or content. As illustrated in FIG. 1, instance 124 is located in a different geographic location than instance 128, but both instances 124 and 128 of the resource provide the same or similar content and/or functionality. When client 134 requests content or functionality available from both instances 124 and 128 of the resource, ISP/OSP network 100 determines whether to route client 134 to instance 124 or to instance 128.

A request from client 134 for content or functionality available from both resource 124 and resource 128 is routed to the resource selection system 132, which determines whether to route client 134 to resource 124 or resource 128. In one implementation, the resource selection system 132 considers network routability information when determining whether to route client 134 to resource 124 or resource 128. Additionally or alternatively, the resource selection system 132 may consider other factors when determining whether to route client 134 to resource 124 or resource 128. For example, the resource selection system 132 may consider geographic proximity, resource utilization, network utilization, and/or maintenance of peering agreements when determining whether to route client 134 to resource 124 or resource 128.

The networked computing environment illustrated in FIG. 1 is merely an example. For instance, ISP/OSP network 100 may be connected to more than one peer network. In addition, ISP/OSP network 100 may maintain more sub-networks than illustrated or fewer sub-networks than illustrated. Indeed, ISP/OSP network 100 need not maintain any sub-networks. Furthermore, ISP/OSP network 100 may be a Tier 1 network while network 102 is a Tier 2 or lower network. Additionally or alternatively, ISP/OSP network 100 may be a Tier 2 or lower network while network 102 is a Tier 1 network or ISP/OSP network 100 and network 102 may both be Tier 2 or lower networks. Moreover, while resource network 106 is illustrated as being connected to backbone network 104 through only one edge router 112 and resource network 108 illustrated as being connected to backbone network 104 through only one edge router 116, it should be appreciated that both of resource networks 106 and 108 could be connected to backbone network 104 through one or more edge routers, with each edge router potentially peering with one or more different peer networks (not shown).

Figure 2:
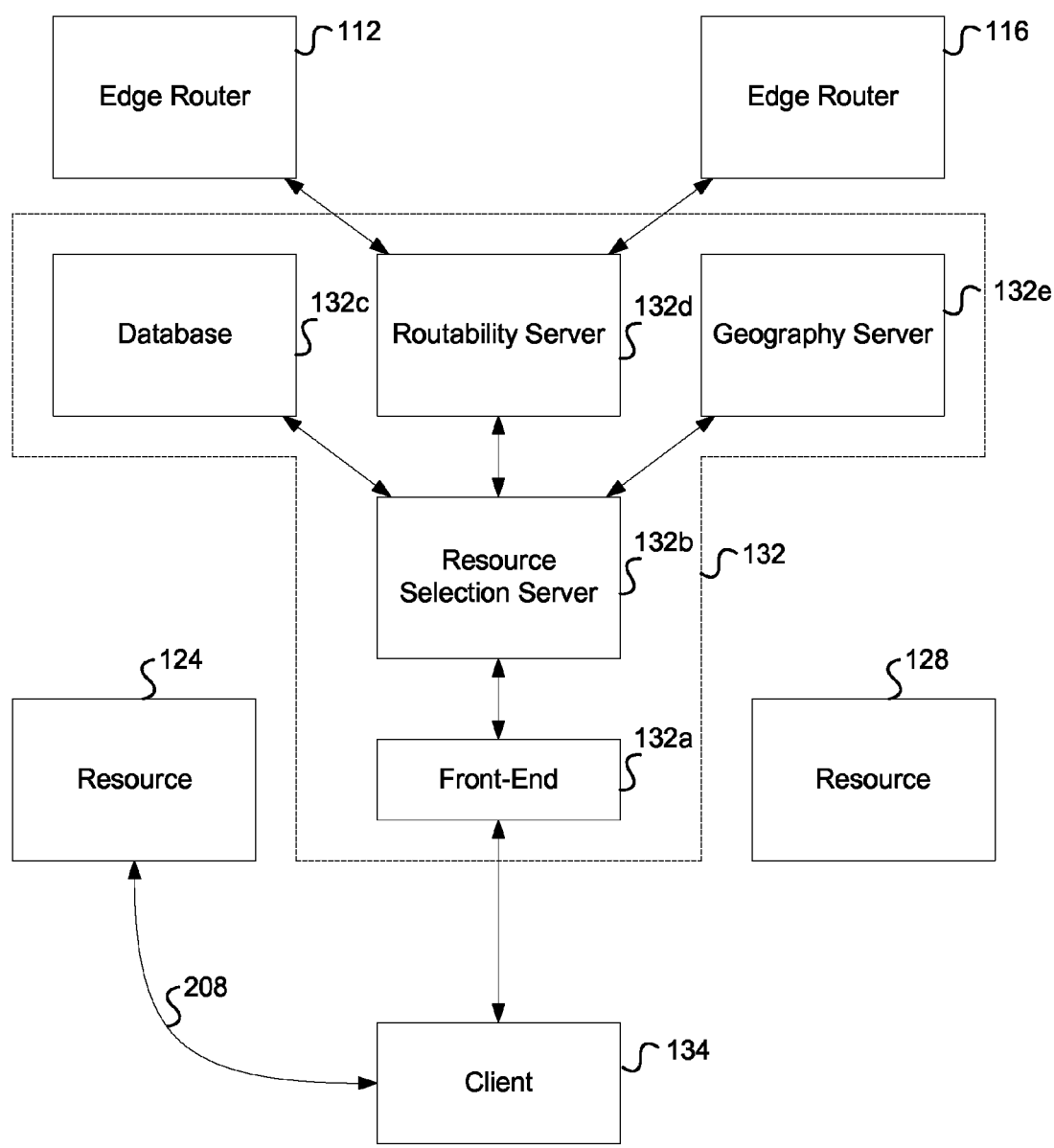
FIG. 2 is a block diagram of a resource selection system.

FIG. 2 illustrates one implementation of resource selection system 132. Resource selection system 132 includes a front-end server 132a, a resource selection server 132b, a database 132c, a routability server 132d, and a geography server 132e.

Front-end server 132a communicates with resource selection server 132b, which communicates with database 132c, routability server 132d, and geography server 132e. Routability server 132d communicates with edge routers 112 and 116.

Front-end server 132a is configured to receive a request for a resource maintained on ISP/OSP network 100 from a client. When front-end server 132a receives a request for a resource from a client, front-end server 132a sends a request to select a particular instance of the resource to the resource selection server 132b, receives an indication of a selected instance of the resource from the resource selection server 132b, and redirects the client to the selected instance of the resource.

The front-end server 132a is configured to be able to interpret a number of different protocols for requesting resources. Thus, when front-end server 132a receives a request for a resource using a particular protocol, the front-end server 132a can interpret the particular protocol request to determine what resource is requested. Similarly, the front-end server 132a is configured to be able to handle protocol specific redirects after receiving an indication of a selected instance of the resource from the resource selection server 132b. For example, if the front-end server 132a receives an HTTP request for a resource, the front-end server 132 knows how to interpret the HTTP request to determine what resource is being requested and is configured to handle an HTTP-specific redirect to the selected instance of the resource.

The front-end server 132a may also maintain a default listing of the instances of resources maintained by ISP/OSP network 100. Consequently, in the event of resource selection server 132b failure, the front-end server 132a is capable of selecting an instance of a resource in response to a request from a client for a resource maintained by ISP/ISP network 100. For example, in such a situation, the front-end server 132a may select instances of a resource based on a round-robin scheme.

When resource selection server 132b receives a request for a resource from the front-end server 132a, resource selection server 132b selects an instance of the resource and sends an indication of the selected instance of the resource to the front-end server 132a.

When selecting an instance of the resource, the resource selection server 132b considers routability information made accessible by routability server 132d. Additionally or alternatively, the resource selection server 132b may consider geographic proximity, resource utilization, network utilization, and/or maintenance of peering agreements when selecting an instance of a resource to which to route a client. In order to access geographic information of the client, the resource selection server 132b communicates with geography server 132e. In order to access resource and/or network utilization information, the resource selection server 132b communicates with database 132c. In order to access information relevant to the maintenance of peering agreements, the resource selection server 132b communicates with database 132c.

The database 132c may store instance preference scores for individual instances of a resource. The instance preference scores may be used to help distribute requests for a resource to individual instances of the resource in a disproportionate manner, all other factors being equal. Thus, the instance preference scores may be used to reduce or limit the number of requests for a resource routed to an individual instance of the resource when, for example, maintenance is being performed on the instance of the resource or the owner of the ISP/OSP network 100 is attempting to maintain one or more peering agreements.

Database 132c maintains a resource table identifying the locations of instances of a resource maintained by the ISP/OSP network 100. For each instance of a resource, the resource table also identifies the first edge router(s) on backbone network 104 that will have the first opportunity to handle a packet of information sent from the instance of the resource to the client. In addition, the database 132c may include other information that facilitates the selection of a particular instance of a resource from multiple instances of the resource. For example, the resource table may include resource and network utilization information for a particular instance of a resource. The resource utilization information may reflect the load on a server providing the particular instance of the resource. For instance, the resource utilization information for a particular instance of a resource may indicate that the server is currently handling 20% of its capacity. Similarly, the network utilization information for a particular instance of a resource may reflect the load on the network on which the resource resides. For instance, the network utilization information for a particular instance of a resource may indicate that the network on which the resource resides is currently carrying 20% of the maximum volume of network traffic the network can sustain.

Furthermore, the resource table may include one or more indications of a preferred instance or instances of a resource based on the geographic location of the client. For example, the client may be associated with a particular geographic zone based on the geographic location of the client. For instance, a client located in Washington, D.C. may be associated with a United States East Coast zone, a client located in Chicago, Ill. may be associated with a United States Central zone, and a client located in Los Angeles, Calif. may be associated with a United States West Coast zone. Based on the geographic location of the client, the resource table may assign a geography score to each instance of a resource.

For example, consider instances of a resource located in New York, Atlanta, Chicago, Dallas, and Los Angeles. If the client is located in Washington, D.C. and is associated with the United States East Coast zone, the instances of the resource located in New York and Atlanta may be assigned geography scores of "1." Meanwhile, the instance of the resource located in Chicago may be assigned a geography score of "0.75"; the instance of the resource located in Dallas may be assigned a geography score of "0.6"; and the instance of the resource located in Los Angeles may be assigned a geography score of "0.4."

Routability server 132d stores copies of the routing tables for the edge routers 112 and 116 on the backbone network 104. In order to obtain accurate and up-to-date routing copies of the routing tables, routability server 132d may request copies of routing tables from edge routers 112 and 116 in real-time or nearly real-time. For example, routability server 132d may use BGP to communicate with edge routers 112 and 116 to receive routing table updates from edge routers 112 and 116. Thus, the routability information provided by routability server 132d may include, for example, how an edge router 112 or 116 would route a packet of information from an instance of the resource to the client, and, when the edge router would route the packet to a peer network, an identification of that peer network.

Geography server 132e maintains a geographic lookup table. The lookup table may be used to associate the interne protocol (IP) address of a client with the geographic location of the client. The geography server 132e may resolve the geographic location of the client 134 only approximately, or the geography server 132e may resolve the geographic location of the client 134 to a more specific level. For example, the geography server 132e may resolve the geographic location of the client 134 at the continent level, the regional level, the country level, the intra-country regional level, the state level, the municipality level, the street level, etc.

Figure 3:
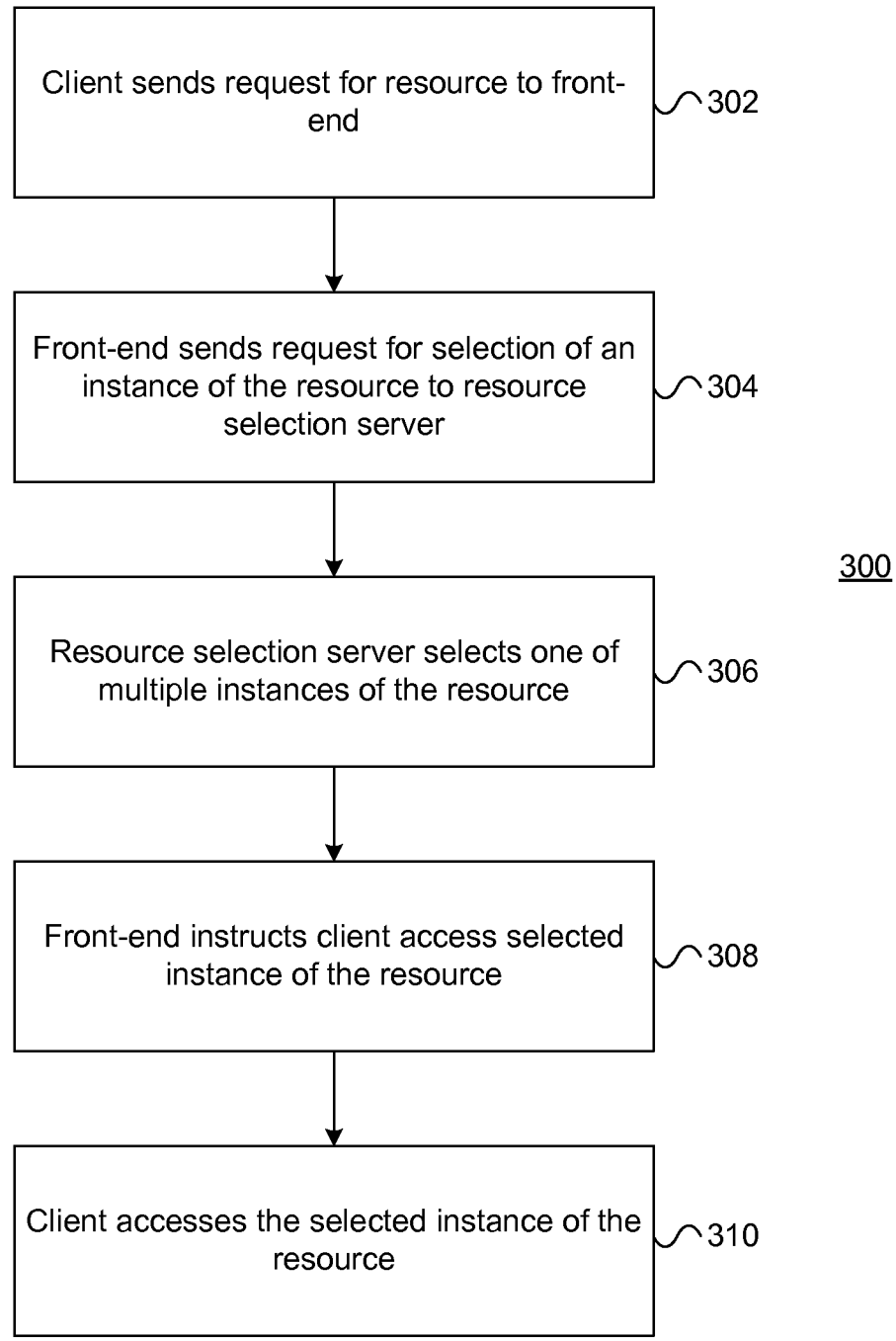
FIG. 3 is a flow chart of an operation of a resource selection system.

FIG. 3 illustrates an example of a process 300 for selecting a particular instance of a resource from multiple instances 124 and 128 of the resource maintained by ISP/OSP network 100 in response to a request for the resource from the client 134. The process 300 is initiated when the front-end server 132a receives a request from client 134 for the resource (302). For example, the client 134 may send a request for streaming media or the client 134 may send a request for resources that are retrieved by a proxy cache server.

The front-end server 132a receives the request for the resource from client 134 and sends a request for selection of a particular instance of the resource (i.e., instance 124 or instance 128) to the resource selection server 132b (304). For instance, the request may include an identification of the resource and the IP address of the client 134, which are then used by resource selection server 132b to select an instance of the resource.

Resource selection server 132b is configured to receive a request for a resource from the front-end server 132a and to select an instance of the resource. The resource selection server 132b selects one of the instances of the resource and sends an indication of the selected resource to the front-end server 132a (306).

In order to do so, the resource selection server 132b may use an algorithm to decide which of the multiple instances of the resource a particular client system will access. For example, a client system may be assigned to a particular instance of a resource based on geography. A lookup table may be used to associate the IP address of a client system with the geographic location of the client system. A determination then may be made as to which instance of the resource is geographically closest to the client system, and the client system may be redirected to the instance of the resource that is geographically closest to the client system.

For example, a client system 134 located in Greenville, South Carolina may request a resource from ISP/OSP network 100. ISP/OSP network 100 may maintain two instances 124 and 128 of the resource. One of the instances 128 of the resource may be located in Atlanta, Ga. while the second instance 124 of the resource may be located in Washington, D.C. If geographic location is the only criterion taken into account, the client system 134 located in Greenville may be associated with the instance 128 of the resource in Atlanta because Greenville is geographically closer to Atlanta than to Washington, D.C.

In some instances, however, selecting an instance of a resource based on the closest geographic location may not be optimal. For example, there may not be a direct network connection between the client's network 102 and the edge of the ISP/OSP's network 100 in Atlanta, but there may be a direct connection 140 between the client's network 102 and the edge of the ISP/OSP's network 100 in Washington, D.C. As a result, when the client 134 in Greenville communicates with the instance 128 of the resource in Atlanta, a communication from the client 134 to the instance 128 of the resource in Atlanta is sent to Washington, D.C. first and then is forwarded across the ISP/OSP's 100 backbone network 104 to the instance 128 of the resource in Atlanta. In such a scenario, it may be desirable to associate the client 134 in Greenville with the instance 124 of the resource in Washington, D.C. rather than the instance 128 of the resource in Atlanta, since routing communications from the client 134 in Greenville to Washington, D.C. and then forwarding the communications across the ISP/OSP's 100 backbone network 104 to the instance 128 of the resource in Atlanta instead of the instance 124 of the resource in Washington, D.C. may increase transmission time and may increase transmission costs due to the consumption of bandwidth on the ISP/OSP's backbone network 104.

Therefore, the resource selection server 132b may consider other selection criteria in addition to or in place of the geographic location of the client 134 when selecting an instance of the resource to which to route the client 134. For example, the selection algorithm employed by the resource selection server 132b may consider one or more different selection criteria, either separately or in combination, including, but not limited to, the geographic location of the client, resource utilization, network utilization, and network routability information. Resource utilization generally indicates the load on a particular instance of the resource, while network utilization generally indicates the load on the network hosting the particular instance. Network routability information generally indicates at least a portion of the network path that would be traversed by a packet or other communication between the particular instance and the client. An implementation that takes a combination of these factors into account is described in more detail below with respect to FIG. 4.

Once the resource selections server 132b selects one of the instances of the resource and sends an indication of the selected resource to the front-end server 132a (306), the front-end server 132a receives the indication of the selected instance of the resource and instructs the client 134 to access the selected instance of the resource (308). The client 134 then accesses the selected instance of the resource (310). To instruct the client 134 to access the selected instance of the resource, the font-end server 132a may employ a protocol specific redirect. If the protocol is HTTP, for instance, the front-end server 132a may issue the HTTP redirect directive to the client 134, which results in the client 134 being redirected to the selected instance of the resource.

As a specific example of the foregoing process, client 134 may send a request to front-end server 132a for content or functionality available from both instances 124 and 128 of the resource. The request from client 134 may include an identification of the resource and the IP address of the client 134. Front-end server 132a receives the request from client 134 and sends a request for selection of an instance of the resource to the resource selection server 132b. The request for selection of an instance of the resource from front-end server 132a may include the identification of the resource and the IP address of the client.

In response to the request for selection of an instance of the resource, the resource selection server 132b selects instance 124 based, at least in part, on routability information obtained from routability server 132d. Specifically, based on information from routability server 132d, resource selection server 132b determines that a packet of information sent from instance 124 to client 134 will be routed across peering connection 140 rather than across backbone network 104. In contrast, based on information from routability server 132d, resource selection server 132b determines that a packet of information sent from instance 128 to client 134 will be routed across backbone network 104. Based, at least in part, on the determination that a packet of information sent from instance 124 to client 134 will not be routed across backbone network 104, while a packet of information sent from instance 128 to client 134 will be so routed, resource selection server 132b selects instance 124. Resource selection server 132b sends an indication to front-end server 132a indicating that the resource selection server 132b selected instance 124. The front-end server 132a receives the indication that resource selection server 132b selected instance 124 and redirects client 134 to instance 124.

Figure 4:
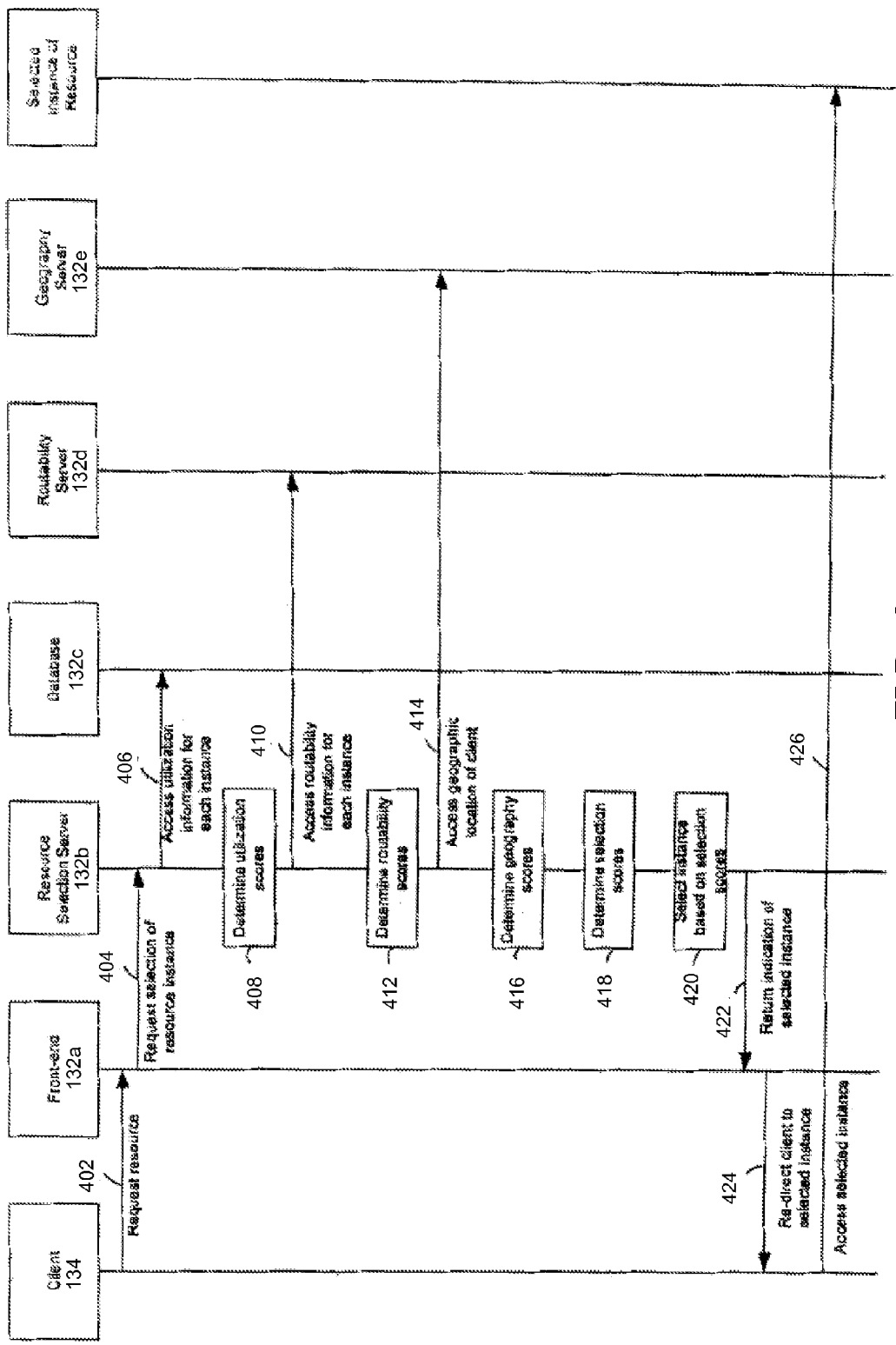
FIG. 4 is a diagram illustrating communications and processing of components of a resource selection system.

FIG. 4 illustrates one implementation of the communications and processing 400 performed by components of system 100 to select an instance of a resource maintained by ISP/OSP network 100 in response to a request for the resource from the client 134. In this implementation, resource selection server 132b selects an instance of a resource based on a combination of routability information, resource utilization information, network utilization information, and geographic information.

Client 134 sends a request for a resource to the ISP/OSP network 100 (402). The request for the resource is received by the front-end server 132a, which, in turn, sends a request to the resource selection server 132b to select an instance of the requested resource maintained by the ISP/OSP network 100 (404). The request includes the IP address of the client 134 and an indication of the resource selected.

The resource selection server 132b accesses utilization information stored in the database 132c for individual instances of the requested resource (406). For a particular instance of the resource, the utilization information may include information related to the load on the resource (resource utilization). Additionally, or alternatively, for a particular instance of the resource, the utilization information may include information related to the volume of network traffic currently being carried over the network that hosts the resource (network utilization). Based on the utilization information, the resource selection server 132b determines one or more utilization scores for the individual instances of the requested resource (408).

In one implementation, an individual instance of the resource is given a utilization score ranging anywhere from "0" to "1," where a higher score indicates a more desirable instance of the resource from a utilization perspective. For example, an individual instance of a resource that is currently handling only a small volume of requests for the resource and that resides on a network that is currently carrying only a small volume of network traffic will receive a high score (e.g., "0.8"), while an individual instance of a resource that is currently handling a large volume of network traffic and that resides on a network that is currently carrying a large volume of network traffic will receive a low score (e.g., "0.2").

In another implementation, an instance of a resource is given both a resource utilization score and a network utilization score. The resource utilization score reflects the number of requests for the instance of the resource currently being handled by the instance of the resource. The resource utilization score for an instance of the resource may be derived based on the percentage of the total capacity of the instance of the resource currently being used. For example, the resource utilization score may be defined by the following equation:

$$\text{Resource utilization score} = 1 - \% \text{ resource utilization} \quad (1)$$

Thus, if an instance of the resource is currently experiencing 20% utilization, the instance of the resource may receive a resource utilization score of "0.8."

Similarly, the network utilization score for an instance of the resource reflects the volume of network traffic currently being carried by the network on which the resource resides. The network utilization score for an instance of the resource may be derived based on the percentage of the total capacity of the network currently being used. For example, the network utilization score may be defined by the following equation:

$$\text{Network utilization score} = 1 - \% \text{ network utilization} \quad (2)$$

Thus, if an instance of the resource resides on a network currently experiencing 20% utilization, the instance of the resource may receive a network utilization score of "0.8." The utilization information stored in the database 132c may include the percent resource utilization for each instance of a resource and the percent network utilization for each instance of the resource, and the resource selection server 132b may determine the resource utilization and network utilization scores for each instance of the resource based on the utilization information using, for example, equations (1) and (2). Additionally, or alternatively, the utilization information stored in the database 132c may include the resource and network utilization scores for each instance of the resource.

Also, as shown in FIG. 4, the resource selection server 132b accesses routability information maintained by the routability server 132d for individual instances of the requested resource (410). The routability information for an instance of a resource may indicate at least a portion of the network route between the resource and the client 134. As discussed above, the routability server 132d stores copies of the routing tables for edge routers 112, 114 and 116 on the ISP/OSP's backbone network 104. The routing table for an individual edge router indicates how the edge router will route a communication or packet of information. For example, the routing table for edge router 112 may indicate that a packet sent from instance 124 destined for client 134 will be sent from edge router 112 to peer network 102. In other words, the routing table may indicate that the next hop for such a packet at edge router 112 is edge router 138 on peer network 102. This may be the case because of the direct peering connection 140 between edge router 112 on the ISP/OSP's backbone network 104 and edge router 138 on peer network 102. On the other hand, the routing table for edge router 116 may indicate that a packet sent from instance 128 to client 134 will be sent from edge router 116 to the ISP/OSP's backbone network 104. In other words, the next hop for such a packet at edge router 116 is the backbone network 104. This may be because of the absence of a direct connection between edge router 116 and peer network 102.

For each instance of the resource, resource selection server 132b obtains such routing information from routability server 132d for the backbone edge router(s) that will have the first opportunity to handle a packet of information sent from the instance of the resource to the client. For example, for instance 124, resource selection server 132b determines how edge router 112 would route a packet from instance 124 to client 134, while, for instance 128, resource selection server 132b determines how edge router 116 would route a packet from instance 128 to client 134. Based on such routability information, the resource selection server 132b determines routability scores for the individual instances of the resource (412).

In one implementation, an individual instance of the resource is given a binary routability score of either "0" or "1," where a "0" indicates an undesirable instance of the resource from a routability perspective and a "1" indicates a desirable instance of the resource from a routability perspective.

If the owner of ISP/OSP network 100 wishes to minimize the load carried across its backbone network 104, the resource selection server 132b can assign routability scores based on whether communications with the instances of the resource will be routed over the backbone network 104. For example, in response to a request for a resource from client 134 that is available at both instance 124 and instance 128, the resource selection server 132d may assign instance 124 a routability score of "1" because the routing table for edge router 112 indicates that a packet from instance 124 to client 134 will be routed to peer network 102 over the direct peering connection 140 rather than across backbone network 104. At the same time, the resource selection server 132b may assign instance 128 a routability score of "0" because the routing table for edge router 116 indicates that a packet from instance 128 to client 134 will be routed across the backbone network 104.

In some situations, it may be desirable for ISP/OSP network 100 to prevent or reduce the amount of traffic sent onto a particular peer network in general or to prevent or reduce the traffic sent onto a particular peer network from a particular edge router. For example, ISP/OSP network 100 may wish to maintain peering agreements at one or more edge routers connected to one or more peer networks. Consequently, in some situations, ISP/OSP network 100 may wish to limit the amount of traffic sent across a particular peer connection so as to maintain the proper ratio between incoming and outgoing traffic across the peer connection.

Accordingly, the resource selection server 132b may assign routability scores based on the edge routers and peer networks over which communications between the client and particular instances of the resource will be routed. For example, if ISP/OSP network 100 desired to minimize the network traffic passed across the direct peering connection 140 from edge router 112 to peer network 102, the resource selection server 132b may assign instance 124 a routability score of "0" if the routing table for edge router 112 indicates that packets from instance 124 to client 134 will be routed to peer network 102 over the direct peering connection 140. At the same time, the resource selection server 132b may assign a routability score of "1" to an instance of the resource that would be routed from the ISP/OSP network 100 to peer network 102 across (1) an alternate direct peering connection (not shown) between backbone network 104 and peer network 102 or (2) across another peer network (not shown). Additionally or alternatively, instead of assigning a binary "0" or "1," the resource selection server 132b may assign an individual instance of the resource a routability score ranging anywhere from "0" to "1," where a higher score indicates a more desirable instance of the resource from a routability perspective.

For example, it may be possible to determine the routing path across the backbone network 104 for a packet of information sent by a particular instance of the resource to the client based on the routing table for the edge router that is closest to the particular instance of the resource. In addition, it may be possible to determine the current utilization of the routing path across the backbone network 104. In such a situation, the current utilization of the routing path across the backbone network 104 can be factored into the routability score. For example, the resource selection server 132b may assign a routability score of "1" for an instance of the resource for which communications will not be routed across the backbone network 104. For an instance of a resource for which communications will be routed across the backbone network, the resource selection server 132 may assign the instance of the resource a routability score based on the following equation:

$$\text{Routability score} = 1 - \% \text{ utilization} \qquad (3)$$

where % utilization is a measure of the network traffic across the routing path across the backbone network 104. Thus, if the routing path for communications between instance 128 and client 134 across backbone network 104 is experiencing 50% utilization, the resource selection server 132b will assign resource 128 a routability score of 1-50%=0.5.

The routability score may reflect the desire of the owner of the ISP/OSP network 100 both to minimize traffic carried across backbone network 104 and to maintain peering agreements. Also, for example, the routability score may be used to help Tier 2 and lower ISPs maintain lower costs by controlling the peer connections over which traffic flows. Tier 2 ISPs, for instance, may have different contracts with different Tier 1 ISPs and therefore may prefer that certain Tier 1 ISPs or their own backbone carry traffic rather than the more expensive peer connections.

In some implementations, an instance preference score may also be used to help distribute requests for a resource to individual instances of the resource in a disproportionate manner, all other factors being equal. For example, if maintenance is being performed on a particular instance of the resource, it may be desirable to reduce or limit the number of requests for the resource routed to the particular instance of the resource on which maintenance is being performed. In such cases, the resource selection server 132*b* may access instance preference scores stored in the database 132*c* for each instance of the resource.

The instance preference score can be used to penalize a particular instance of the resource for which it is desirable to limit or reduce the number of requests routed to the resource. For example, an individual instance of the resource may be given an instance preference score ranging anywhere from "0" to "1," where a higher score indicates a more desirable instance of the resource. Thus, if maintenance is being performed on a particular instance of a resource, the instance of the resource may be assigned a relatively low instance preference score (e.g., "0.2"). If maintenance is not being performed on a particular instance of a resource, the instance of the resource may be assigned a high instance preference score (e.g., "1").

The instance preference score can also be used to define the proportions in which requests for a resource are routed to individual instances of the resource. For example, all other factors being equal, an instance with an instance preference score of "1" will be sent twice as many requests as an instance with an instance preference of "0.5".

In addition, as illustrated in FIG. 4, the resource selection server 132*b* accesses the geographic location of the client 134 from the geography server 132*e* (414). As discussed above, the geography server 132*e* maintains a geographic lookup table. The lookup table is used to associate the IP address of the client 134 with the geographic location of the client 134. Based on the geographic location of the client 134, the resource selection server 132*b* determines geography scores for the individual instances of the resource (416), for example, by accessing geography scores stored in database 132*c*.

In one implementation, an individual instance of the resource is given a geography score ranging anywhere from "0" to "1," where a higher score indicates a more desirable instance of the resource from a geographic perspective. Thus, an individual instance of a resource that is located relatively close to the client 134 in geographic terms may be given a high score (e.g., "0.8"), while an individual instance of a resource that is located relatively far away from the client 134 in geographic terms may be given a low score (e.g., "0.2").

Based on the utilization score(s), routability scores, and geography scores, the resource selection server 132*b* determines selection scores for the individual instances of the resource (418) and selects an individual instance of the resource based on the selection scores (420). In one implementation, the selection scores are determined by combining the utilization scores, the routability scores, and the geography scores. For example, the selection score for an individual resource may be determined by multiplying the utilization score(s), the routability score, and the geography score. After the selection scores for the individual instances of the resource have been determined, the resource selection server 132*b* selects the individual instance of the resource based on the selection scores. For example, in an implementation in which higher selection scores indicate a more desirable instance of the resource, the selection server 132*b* may select the instance of the resource with the highest selection score.

The resource selection server 132*b* returns an indication of the selected resource to the front-end server 132*a* (422), the front-end server 132*a* redirects the client 134 to the selected resource (424), which causes the client 134 to access the selected instance of the resource (426).

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, depending on the goals of the owner of the ISP/OSP network 100, the selection scores for the individual instances of the resource may be based on the utilization scores, the routability scores, or the geography scores individually or any combination thereof. The owner of the ISP/OSP network 100 may wish to manage load distribution across multiple instances of a resource, manage network load distribution (e.g., limit network traffic across backbone network 104), maintain peering agreements, and/or optimize user experience (e.g., by selecting the least utilized and geographically closest instance of the resource). Consequently, the determination of the selection scores, the utilization scores, the routability scores, and/or the geography scores may be varied in accordance with the goals of the owner of the ISP/OSP network 100. Furthermore, different algorithms may be used for determining the utilization, routability, and geography scores depending on the goals of the owner of the ISP/OSP network 100. Additionally or alternatively, the weighting of the utilization, routability, and geography scores in determining the selection scores may be varied depending on the goals of the owner of the ISP/OSP network 100.

Accordingly, other implementations are within the scope of the following claims.

What is claimed is:

1. A computer-implemented method for processing resource requests, the method comprising:

receiving a request for a resource from a client, wherein at least two instances of the resource are maintained, a first one of the two instances being accessible by a client through a first network route between the client and the first one of the two instances, and a second one of the two instances being accessible by the client through a second network route between the client and the second one of the two instances;

accessing routability information for at least a portion of the first network route and at least a portion of the second network route, wherein the routability information indicates that at least one of the first network route and the second network route includes a peering connection and identifies a peer network associated with the peering connection;

determining that the peering connection is subject to a peering agreement that regulates network traffic that is to be sent over the peering connection selecting, with a processor, one of the at least two instances of the resource based, at least in part, on both a selection score and an instance preference score, wherein the selection score is computed based on the routability information and the peering agreement, wherein the instance preference score defines proportions in which requests for a resource should be routed to individual instances of the at least two instances of the resource, and wherein the selection score is further based on at least one of: a geographic location of the client, resource utilization information, or network utilization information; and instructing the client to access the selected instance of the resource.

2. The method of claim 1, wherein selecting one of the two instances of the resource comprises:

selecting the first one of the two instances based, at least in part, on a portion of the first network route not including a network maintained by an entity that maintains the two instances of the resource.

3. The method of claim 1, wherein selecting one of the two instances of the resource comprises:

selecting the first one of the two instances based, at least in part, on a portion of the first network route including a network maintained by an entity that maintains the two instances of the resource.

4. The method of claim 1, further comprising determining the geographic location of the client, wherein the selection score is based on the geographic location of the client.

5. The method of claim 1, wherein the resource utilization information indicates utilization of each of the first one and the second one of the two instances of the resource, wherein the selection score is based on the resource utilization information.

6. The method of claim 1, wherein the network utilization information indicates network utilization of each of a first network on which the first one of the two instances resides and a second network on which the second one of the two instances resides, wherein the selection score is based on the network utilization information.

7. The method of claim 1, further comprising:

determining the geographic location of the client;

accessing the resource utilization information, wherein the resource utilization information indicates utilization of each of the first and second of the two instances of the resource; and accessing network utilization information, wherein the network resource utilization information indicates network utilization of each of a first network on which the first one of the two instances resides and a second network on which the second one of the two instances resides, wherein the selection score is based on each of the geographic location of the client, the resource utilization information, and the network utilization information.

8. The method of claim 1, wherein the selection score is further computed based on maintaining a ratio of incoming and outgoing traffic across the peering connection.

9. A system for processing a request for a resource from a client, a first instance of the resource being accessible by the client through a first network route, and a second instance of the resource being accessible by the client through a second network route, wherein at least two instances of the resource are maintained, the system comprising;

a routability server to determine routability information for at least a portion of the first network route and at least a portion of the second network route, wherein the routability information indicates that at least one of the first network route and the second network route includes a peering connection subject to a peering agreement that regulates network traffic that is to be sent over a peer network associated with the peering connection and identifies a peer network associated with the peering connection, wherein the routability server comprises at least one processor;

a resource selection server to select one of the two instances of the resource based, at least in part, on both a selection score and an instance preference score, wherein the selection score is computed based on the routability information and the presence of the peering connection, wherein the instance preference score defines proportions in which requests for a resource should be routed to individual instances of the at least two instances of the resource, and wherein the selection score is further based on at least one of: a geographic location of the client, resource utilization information, or network utilization information; and a front-end server to instruct the client to access the selected instance of the resource.

10. The system of claim 9, further comprising a geography server to determine the geographic location of the client, and wherein the selection score is based on the geographic location of the client.

11. The system of claim 9, wherein the resource utilization information indicates utilization of each of the two instances of the resource, and wherein the selection score is based on the resource utilization information.

12. The system of claim 9, wherein the network utilization information indicates network utilization of each of a first network on which the first one of the two instances resides and a second network on which the second one of the two instances resides, and wherein the selection score is based on the network utilization information.

13. The system of claim 9, further comprising:

a geography server to determine the geographic location of the client;

a database that stores the resource utilization information, wherein the resource utilization information indicates utilization of each of the two instances of the resource, and stores the network utilization information, wherein the network utilization information indicates a network utilization of each of a first network on which the first one of the two instances resides and a second network on which the second one of the two instances resides; and wherein the selection score is based on each of the geographic location of the client, the resource utilization information, and the network utilization information.

14. The system of claim 9, wherein the selection score is further computed based on maintaining a ratio of incoming and outgoing traffic across the peering connection.

15. A non-transitory computer useable medium having a computer program embodied thereon, the computer program including instructions for causing a computer to perform the following operations:

receive a request for selection of one of at least two instances of a resource, wherein at least two instances of the resource are maintained, a first one of the two instances being accessible by a client through a first network route, and a second one of the two instances being accessible by the client through a second network route;

access routability information for at least a portion of the first network route and at least a portion of the second network route, wherein the routability information indicates that at least one of the first network route and the second network route includes a peering connection subject to a peering agreement that regulates network traffic that is to be sent over a peer network associated with the peering connection;

select one of the two instances of the resource based, at least in part, on both a selection score and an instance preference score, wherein the selection score is computed based on the routability information and the peering agreement, wherein the instance preference score defines proportions in which requests for a resource should be routed to individual instances of the at least two instances of the resource, and wherein the selection score is further based on at least one of: a geographic location of the client, resource utilization information, or network utilization information; and send a response to the request for selection of one of the two instances of the resource, the response including an indication of the selected instance.

16. The computer usable medium of claim 15, wherein the computer program further includes instructions for causing the computer to access information indicating geographic locations of each of the at least two instances of the resource, and wherein the selection score is further based on the geographic locations of each of the at least two instances of the resource.

17. The computer usable medium of claim 15, wherein the computer program further includes instructions for causing the computer to access the resource utilization information, wherein the resource utilization information indicates utilization of each of the two instances of the resource, and wherein the selection score is based on the resource utilization information.

18. The computer usable medium of claim 15, wherein the computer program further includes instructions for causing the computer to access network utilization information, wherein the network utilization information indicates network utilization of each of a first network on which the first one of the two instances resides and a second network on which the second one of the two instances resides, and wherein the selection score is based on the network utilization information.

19. The computer usable medium of claim 15, wherein the computer program further includes instructions for causing the computer to:

access information indicating the geographic location of the client;

access the resource utilization information, wherein the resource utilization information indicates utilization of the two instances of the resource; and access the network utilization information, wherein the network utilization information indicates network utilization of each of a first network on which the first one of the two instances resides and a second network on which the second one of the two instances resides; and wherein the selection score is based on the geographic location of the client, the resource utilization information, and the network utilization information.

20. The method of claim 1, wherein the selection score is a numeric value.

21. The computer usable medium of claim 15, wherein the selection score is further computed based on maintaining a ratio of incoming and outgoing traffic across the peering connection.

* * * * *

UNITED STATES PATENT AND TRADEMARK OFFICE
CERTIFICATE OF CORRECTION

PATENT NO. : 9,450,860 B2  
APPLICATION NO. : 13/329841  
DATED : September 20, 2016  
INVENTOR(S) : Pablo Averbuj et al.

Page 1 of 1

It is certified that error appears in the above-identified patent and that said Letters Patent is hereby corrected as shown below:

On the Title Page:

Related U.S. Application Data should read

(63) Continuation of application No. 11/321,039, filed on Dec. 30, 2005, now Pat. No. 8,082,348.

(60) Provisional application No. 60/691,253, filed on Jun. 17, 2005

Signed and Sealed this  
Fifteenth Day of November, 2016

Michelle K. Lee  
*Director of the United States Patent and Trademark Office*